Patented June 17, 1941

2,246,230

UNITED STATES PATENT OFFICE 2,246,230

SPRAY OIL

Wallace J. Yates, Martinez, Calif., assignor to Shell Development Company, San Francisco, Calif., a corporation of Delaware No Drawing. Application March 29, 1939, Serial No. 264,738

9 Claims. (Cl. 167—28)

This invention pertains to the manufacturing of improved insecticidal spray oils and is more particularly concerned with methods of producing emulsions or dispersions of such oils in water which are particularly effective as insecticides and have an unusually high factor of safety when applied to vegetation.

Petroleum oils, when used as insecticides, are usually mixed with water in the proportions of about 1% to 2% of oil for foliage spraying, and up to 6% or more of oil for dormant spraying. The water, by reducing the oil content of the spray mixture, assists in regulating the amount of oil applied, and prevents damage to the vegetation sprayed. In addition to oil and water, spraying compositions practically always contain an emulsifier, which may be of the soluble-in-water, or the soluble-in-oil type.

Emulsifiers of the first type, which are used in so-called "concentrated commercial emulsions," serve the following principal purposes:
1. They spread the oil over surfaces sprayed and regulate the amount of oil deposited;
2. They assist in effecting an even distribution of the oil in water in the spray tank;
3. They prevent the separation of concentrated emulsions into layers while in storage.

It is thus seen that emulsifiers of this type must also act as storage stabilizers. No such stabilizing action is required of emulsifiers of the second, soluble-in-oil, type since here emulsification occurs only in the spray tank, immediately before use. In general, it may be stated that emulsifiers of this type are preferable to the soluble-in-water type, since they afford a greater ease of handling and, in addition, have a superior spreading action. Such emulsifiers, of course, must have no phytocidal action on the vegetation sprayed; they must be chemically stable, so as not to decompose or deteriorate during storage; they should preferably be non-water soluble in order that they will remain in the oil after spraying, effecting good spreading of the oil over objects sprayed.

It has been known in the art to use as emulsifiers of the soluble-in-oil type some of the compounds obtained from vegetable or animal oils. Thus, certain partially esterfied glycerides, fatty acids of vegetable origin and certain of their derivatives, such as alkyl esters, partially esterfied polyhydric alcohols, etc., have been proposed for this purpose.

It has also been known in the art to use polymerized or boiled animal or vegetable oils of the drying or semi-drying type as spray oil emulsifiers. Typical oils which have been used are boiled or blown rapeseed oil, linseed oil, soya bean oil, hemp seed oil, cotton seed oil, fish oil, etc.

I am also aware that it has been proposed to use partially or wholly saponified oxidized or polymerized animal, vegetable or fish oils as emulsifying agents for mineral oils. However, my invention consists in using unsaponified thermally treated castor oil in small quantities, for producing spray emulsions. Castor oil is known to be a non-drying oil.

I have now found that superior spray oil emulsifiers may be prepared from castor oil by subjecting it to a thermal treatment. This treatment can be carried to various degrees depending on the product desired. When castor oil is heated to 250 to 350° C., preferably about 300° C., and the heat maintained for about an hour the oil becomes less viscous and of lower molecular weight due to some breaking down or cracking which occurs. The heating may be done in a retort at atmospheric pressure, but may also be done in an autoclave at a slightly elevated pressure. When the castor oil is heated for about another hour its viscosity and molecular weight rise slightly, although they do not reach the viscosity and molecular weight of the original oil. Hereafter, the term "heated castor oil" is used to designate castor oil which has been treated as above described, and which has a lower molecular weight and viscosity than untreated oil.

By somewhat longer thermal treatment it is also possible to obtain a polymerized castor oil which has a higher viscosity and molecular weight than the untreated oil. While the exact mechanism of this polymerization is not definitely known, the polymerization is believed to occur at the position of the hydroxy groups, as a result of splitting off water accompanied by simultaneous condensation. Polymerization may proceed to form a semi-solid oil insoluble castor oil or it may be discontinued after the molecular weight has increased only slightly as referred to below. Castor oil treated in the latter way, i. e., castor oil of slightly increased viscosity and molecular weight is hereafter referred to as "soluble castor oil" in accordance with the accepted terminology of the trade. However, it should be understood that both the "soluble castor oil" and the "heated castor oil" are mineral oil soluble.

The term "thermally treated castor oil" as herein used is generic to both the heated and soluble castor oils, and is understood to mean any treatment wherein castor oil is heated to an elevated temperature of from 250 to 350° resulting in a change in its viscosity or molecular weight, but not to the extent that a semi-solid product is formed.

The following example serves to illustrate the effect of thermal treatment on the viscosity and molecular weight of castor oil:

Castor oil having a viscosity of 1355 (second Saybolt Universal at 100° F.) and a molecular weight of 1032 was heated for 1 hour at 300° C. whereupon its viscosity dropped to 550 and its molecular weight to 795. When the heating was continued for another hour, the viscosity rose to 900 and the molecular weight to 938. Heating about 2½ hours led to the formation of thick polymer insoluble in mineral oil. A sample of commercial soluble castor oil has a viscosity of about 1408 and a molecular weight of about 1223.

Although both the heated castor oil and the soluble castor oil are excellent spray oil emulsifiers, the heated castor oil having a molecular weight and viscosity not greater than the original castor oil is preferred in many applications. Normally about 2% of the thermally treated castor oil is used in preparing an emulsifiable spray oil.

In order to compare the emulsifying properties of the other oils with those of the soluble castor oil used according to this invention the following procedure was followed: 1½% of mineral oil containing an oil-soluble emulsifier was added to distilled water, and emulsified by violent agitation. The amount of free oil separated from the emulsion was measured after a settling period of 1½ hours.

In order to determine the spreading qualities of emulsions prepared according to this invention, the following procedure was followed: 4 oz. bottles were coated with a mixture of about 25% paraffin wax and 75% carnauba wax to give them a surface approximating in effect on spreading action that of waxy leaves or fruits. These bottles were suspended from a shaft by a tightly fitting cork and rotated by a pulley at a rate of about a revolution every two seconds. The emulsions were sprayed on the waxed bottles under a pressure of approximately 1040 lbs./sq. in. from a nozzle located at a distance of 2½ feet. The bottles were weighed before and after spraying, and the character of the oil deposit studied to determine the effectiveness of the spray mixtures with respect to coverage, and the amount of oil deposited after the evaporation of the water.

Typical results of such tests are given below and clearly show the superiority of the emulsions prepared with soluble castor oil over those prepared with polymerized or oxidized animal vegetable oils and those containing more common glycerides such as triolein and tristearine and certain standard water soluble emulsifiers.

| | Emulsifier | Emulsion test | Spraying tests | |
|---|---|---|---|---|
| | | Percent of oil retained in emulsion after 1½ hours | Oil deposit on bottles in mgs./154 sq. cm. | Spreading of oil film |
| 1 | Blown rapeseed oil. | 85 | 8 | Very even deposit |
| 2 | Boiled linseed oil* | 95 | 10 | Even deposit. |
| 3 | Castor oil | 80 | 10 | Do. |
| 4 | Soluble castor oil | 95 | 10 | Good even deposit. |
| 5 | Sulfurized lard oil | 85 | 10.5 | Even deposit. |
| 6 | Oxidized fish oil | 80 | 10.5 | Very even deposit. |
| 7 | Triolein | 55 | 20 | Spreading poor, oil largely in drops. |
| 8 | Tristearin | 50 | 19 | Do. |
| 9 | Casein (dilution of concentrated emulsion). | | 16 | Less regular deposit than from 1-5. |
| 10 | Blood albumen (4 oz. per 100 gal.-tank mix application). | | 21 | Less regular deposit than from 1-5. Numerous oil drops. |

*Separates from mineral oil on standing.

To show the superiority of the soluble castor oil over the oxidized or polymerized drying or semidrying oils, the emulsification experiment was repeated, using instead of distilled water, tap water which had a hardness of 144 p. p. m. The following results were obtained:

| | Emulsifier | Percent oil retained after 1½ hours | Percent oil retained after 3 hours |
|---|---|---|---|
| 1 | Soluble castor oil | 98 | 96 |
| 2 | Oxidized fish oil | 70 | 50 |
| 3 | Soluble castor oil* | 98 | 96 |
| 4 | Blown rapeseed oil* | 80 | 65 |
| 5 | Boiled linseed oil* | 55 | 35 |

*Tests after 3 minutes instead of 1 minute shaking.

Since horticultural spraying must be done with water which is locally available rather than with uniformly soft water, it can be seen that soluble castor oil is superior to the other emulsifiers when used under practical spraying conditions, i. e. when hard water is used.

The experiment was then repeated using heated castor oil as an emulsifying agent for 4% of spray oil. Instead of emulsifying the oil by violent agitation as in the previous tests, a mixer was used which worked on the Venturi principle. The following results were obtained. For purposes of comparison, figures are also given on the untreated castor oil and commercial soluble oil.

| Heating period at 300° C. | Viscosity S. S. U. at 100° F. | Molecular weight | Percent oil retained by emulsion | | | |
|---|---|---|---|---|---|---|
| | | | 15 min. | 30 min. | 60 min. | 90 min. |
| 0 | 1,355 | 1,032 | 63 | 48 | 34 | 25 |
| 1 hour | 550 | 795 | 96 | 89 | 84 | 82 |
| 2 hours | 900 | 938 | 97 | 93 | 91 | 88 |
| Soluble castor oil | 1,408 | 1,223 | 92 | 89 | 86 | 84 |

From the standpoint of insecticidal action, the spreading of the oil film and the magnitude of the oil deposit are of utmost importance. The importance of providing a complete oil film over objects sprayed is readily apparent when it is kept in mind that mineral oils kill by contact only, and that oil remaining on sprayed surfaces largely in the form of droplets in a spotty, irregular coverage will not contact all of the insects, particularly when the latter are very small. Careful field tests have demonstrated that products giving relatively low oil deposits give better control, provided the oil is evenly spread, than much heavier oil deposits if the latter are not uniformly spread over objects sprayed.

Although, as has been stated, this invention pertains primarily to the use of a water-insoluble emulsifier, it has sometimes been found advantageous to use water-insoluble emulsifiers in combination with water-soluble emulsifiers, such as soaps, sulfonated fatty or mineral oils, etc., wherein the water-soluble emulsifier serves to tighten the emulsion, thereby reducing the tendency toward stratification in the spray tank, and requiring less agitation in the spray tank than is necessary when less stable emulsions are used. The water-insoluble emulsifier used according to this invention assists in spreading the spray mixture evenly and in depositing a film of desirable thickness on sprayed surfaces.

Spray oils containing oil-soluble emulsifiers of the type described have been found to possess particular advantages when used in conjunction with certain insecticides, such as nicotine, rotenone, pyrethrum, organic thiocyanates etc., and especially with aqueous suspensions of solid powdered stomach or contact insecticides, such for example as lead arsenate lime sulfur, etc. Ordinarily when spray oils are used with such insecticides, the dilute spray mixture contains emulsified oil particles which are separate from the suspended particles of the inorganic insecticide. On the other hand, when thermally treated castor oil is used, the presence of the emulsifiers causes almost complete adsorption of the oil by the suspended insecticide, much as flotation agents adhere to certain types of ores. The oil being lighter than water, and the inorganic insecticide heavier, a combination of the two resulting from adsorption of the former by the latter, can be more readily kept in suspension, with less agitation, then combinations made from pasty type oil emulsions.

Such combinations are particularly good insecticides, as the oil deposits readily on the objects sprayed in the form of an evenly distributed film. The inorganic insecticides, too, are very evenly spread over the surface sprayed, in contrast with the spotty coverage resulting from mixtures of conventional petroleum oil emulsions and inorganic insecticides. The amount of both insecticides deposited can be regulated over fairly broad limits by judicious selection of the emulsifier.

Advantage may also be taken of the excellent spreading qualities of thermally treated castor oil by combining them with other organic compounds, such as alphanaphthylamine, sulfonated fatty oils, lecithine, and others, which by themselves have relatively poor oil spreading characteristics of their own, but have been found to produce a high lead arsenate deposit.

In mixing these insecticides for field use, it has ordinarily been found advantageous to fill the spray tank about one-quarter full with a portion of the water to be used, then to add the emulsifying oil with agitation, and to follow immediately with the inorganic insecticide, after which the remainder of the water is added. This method of mixing ordinarily results in rapid adsorption of the oil, and produces a well dispersed mixture of the powdered insecticide. However, under some conditions it may be advantageous to alter this procedure, and this description is not intended in any way to limit the method of utilizing this invention.

The present application is a continuation-in-part of my patent application Serial No. 38,574, filed August 30, 1935.

I claim as my invention:

1. An emulsifiable spray oil composition comprising a mineral oil and a small quantity of an unsaponified fluid castor oil thermally treated under conditions to effect a change in its viscosity and molecular weight and to render it soluble in mineral oils.

2. An emulsifiable spray oil composition comprising a mineral oil and an emulsifying amount of castor fluid oil, the said castor oil having been rendered soluble in mineral oil and the molecular weight of said castor oil having been modified by heating the castor oil to about 250 to 350° C.

3. The composition of claim 2 in which the castor oil is heated to about 300° C.

4. An emulsifiable spray oil composition comprising a mineral oil and a small amount of unsaponified soluble castor oil, said soluble castor oil being produced by heating castor oil at 250 to 350° C. for a sufficient time to raise its molecular weight.

5. An emulsifiable spray oil composition comprising a mineral oil and a small amount of fluid, unsaponified, heated castor oil, the time and temperatures of heating being sufficient to lower the molecular weight of the castor oil and to render it soluble in mineral oils.

6. The combosition of claim 1 in which the amount of the castor oil is from ½ to 3%.

7. The composition of claim 1 in which the amuont of the castor oil is about 2%.

8. The composition of claim 1 in which is incorporated an insecticide other than mineral oil.

9. The composition of claim 1 in which is incorporated a spreading agent.

WALLACE J. YATES.